United States Patent
Xie et al.

(10) Patent No.: US 9,892,629 B2
(45) Date of Patent: Feb. 13, 2018

(54) WIRELESS DRIVE BASED STAGE SOUND AND LIGHT COORDINATED OPERATION SYSTEM

(71) Applicant: ZHEJIANG DAFENG INDUSTRY CO., LTD., Yuyao (CN)

(72) Inventors: Haiqi Xie, Yuyao (CN); Songbo Jiang, Yuyao (CN); Huanxin Xue, Yuyao (CN); Guoliang Zhu, Yuyao (CN)

(73) Assignee: ZHEJIANG DAFENG INDUSTRY CO., LTD. (CN)

( * ) Notice: Subject to any disclaimer, the term of this patent is extended or adjusted under 35 U.S.C. 154(b) by 2 days.

(21) Appl. No.: 15/233,758

(22) Filed: Aug. 10, 2016

(65) Prior Publication Data

US 2017/0046948 A1    Feb. 16, 2017

(30) Foreign Application Priority Data

Aug. 11, 2015  (CN) .......................... 2015 1 0489159
Aug. 11, 2015  (CN) ..................... 2015 2 0602283 U

(51) Int. Cl.
| | |
|---|---|
| H04M 1/00 | (2006.01) |
| H04Q 7/20 | (2006.01) |
| G08B 21/12 | (2006.01) |
| G08C 17/02 | (2006.01) |
| H04W 4/00 | (2009.01) |
| H04W 84/22 | (2009.01) |
| H04W 84/12 | (2009.01) |
| H04W 84/20 | (2009.01) |

(52) U.S. Cl.
CPC ............ *G08C 17/02* (2013.01); *H04W 4/008* (2013.01); *H04W 84/22* (2013.01); *G08C 2201/20* (2013.01); *H04W 84/12* (2013.01); *H04W 84/20* (2013.01)

(58) Field of Classification Search
CPC ... G08C 17/02; G08C 2201/20; H04W 4/008; H04W 84/12; H04W 84/20; H04W 84/22
See application file for complete search history.

(56) References Cited

U.S. PATENT DOCUMENTS

| | | | |
|---|---|---|---|
| 9,398,669 B2 * | 7/2016 | Aggarwal | ........... H04L 12/2803 |
| 2005/0130717 A1 * | 6/2005 | Gosieski, Jr. | ..... H04L 29/06027 |
| | | | 455/575.2 |
| 2014/0375206 A1 * | 12/2014 | Holland | .................. H02J 9/061 |
| | | | 315/86 |
| 2017/0041401 A1 * | 2/2017 | Ives-Halperin | ......... H04L 67/14 |
| 2017/0124830 A1 * | 5/2017 | Fadell | .................... G08B 19/00 |

* cited by examiner

*Primary Examiner* — Dionne H Pendleton
(74) *Attorney, Agent, or Firm* — Foley & Lardner LLP

(57) ABSTRACT

The present patent application provides a wireless drive based stage sound and light stage coordinated operation system. The system comprises a stage performance control center, a first WLAN communication unit, a second WLAN communication unit, a master control unit, a slave control unit, a first ZIGBEE communication unit, a storage unit, a second ZIGBEE communication unit, a stage light subsystem, a third ZIGBEE communication unit and a stage sound subsystem. The system can achieve centralized monitoring, unified management and synchronization control of multiple stage systems. Furthermore, it adopts the method of wireless control, which can reduce interference and improve the stage performance effect and efficiency.

18 Claims, 3 Drawing Sheets

WIRELESS DRIVE BASED STAGE SOUND AND LIGHT COORDINATED OPERATION SYSTEM

CROSS-REFERENCE TO RELATED PATENT APPLICATIONS

The present application claims priority to and the benefit of both Chinese Patent Application No. 201520602283.7, filed Aug. 11, 2015, and Chinese Patent Application No. 201510489159.9, filed Aug. 11, 2015, both of which are incorporated by reference herein in their entirety.

TECHNICAL FIELD

The present patent application relates to a stage control, and more particularly, to a wireless drive based stage sound and light coordinated operation system.

BACKGROUND

Now, with the development of the cultural industry of China, the role of a digital stage in the recreation performance becomes more and more prominent. The control requirements on sound, light and other stage elements have become more and more high, accurate, and complicated. Stage central control systems are increasingly close to the actual demand of a stage performance.

To achieve the perfect presentation of a stage effect, the emphasis is on the reasonable collocation and the real-time control execution of light, sound, etc. Traditional stage control is manipulated in real time by the stage professional technicians on each separate hardware platform according to the demands of director or scriptwriter. There is a relatively higher requirement on the professional skills of each operator. The workload is heavy and it seems likely to lead to an exception situation on account of an improper operation. In addition, a professional hardware console is too bulky, relatively expensive, not easy to move and transport.

It is the developing direction to improve work efficiency, achieve a centralized monitoring and a unified management, that is, to improve a stage performance effect and achieve the deep processing stage performance effect with sound, light, electricity, illustrations and picture so that stage background, stage light and tableaux are closely linked to a performance theme. And it can overcome the above deficiencies of complicated control including decentralized management and more requirements on operator. However, the existing control systems are difficult to achieve the synchronous centralized control of multiple devices.

SUMMARY

The purpose of the present patent application is achieved by the following technical solution.

According to the embodiment of the present patent application, a wireless drive based stage sound and light coordinated operation system is provided. The system includes a stage performance control center, a first WLAN communication unit, a second WLAN communication unit, a master control unit, a slave control unit, a first ZIGBEE communication unit, a storage unit, a second ZIGBEE communication unit, a stage light subsystem, a third ZIGBEE communication unit and a stage sound subsystem.

The stage performance control center is connected to the master control unit and the slave control unit with the first WLAN communication unit and the second communication unit successively. The master control unit and the slave control unit are connected to the stage light subsystem and the stage sound subsystem with the first ZIGBEE communication unit, the second ZIGBEE communication unit and the third ZIGBEE communication unit respectively. The stage performance control center is configured to store and set up programs required by a stage performance and parameters which each subsystem need to execute.

The master control unit is configured to control the operation of each stage subsystem and receive data transmitted by each subsystem.

The slave control unit is the hot standby unit of the master control center, configured to switch seamlessly when a failure or upgrade happens on the master control center.

The stage light subsystem and sound stage subsystem are configured to control the light and sound unit respectively, according to the instructions of the master control center.

According to the embodiment of the present patent application, the master control unit specifically includes:

The performance raw data download unit is configured to acquire the raw and independent performance data of the stage light subsystem and the stage sound subsystem from the stage performance control center respectively.

The first GPS timing unit is configured to acquire a GPS time signal and transmit the time signal to a data pre-processing unit as a real-time parameter.

The data pre-processing unit is configured to encode the independent performance data of the stage light subsystem and the stage sound subsystem as a stage deep processing performance data according to a performance time setting and a GPS time parameter. The deep processing includes encoding each independent performance data according to the GPS timeline uniformly and creating a two-dimensional table with synchronous action and time.

The distribution unit is configured to distribute the stage deep processing performance data to the stage light subsystem and the stage sound subsystem according to a routing address.

The instruction transmission unit is configured to transmit a control instruction to one or combination of the stage light subsystem and the stage sound subsystem, according to a performance time setting. The instruction transmission unit is configured to carry out a stage performance according to the corresponding data items of the stage deep processing performance data.

According to the embodiment of the present patent application, the master control unit further includes:

The encryption unit is configured to encrypt the stage deep processing performance data after being encoded by the data pre-processing unit.

The routing unit is configured to acquire the routing address of a subsystem which need to transmit a performance data, according to a pre-assigned IP address.

The reset unit is configured to reset the stage light subsystem and the stage sound subsystem, including establishing a connection with the stage light subsystem and the stage sound subsystem and acquiring the original stage of the stage light subsystem and the stage sound subsystem.

According to the embodiment of the present patent application, the slave control center can be configured with the same setting as the master control center and is in hot standby state during the stage performance.

According to the embodiment of the present patent application, the stage light subsystem specifically includes a visual unit, a first performance data acquiring unit, a first performance data decoding unit, a second GPS timing unit, a LED lighting sets control unit, a first storage unit, a LED lighting sets driving unit. The visual unit, the first performance data acquiring unit, the first performance data decoding unit, the second GPS timing unit, the first storage unit and the LED lighting sets driving unit are all connected to the LED lighting sets control unit. The LED lighting sets driving unit is connected to LED lighting sets.

The wireless drive based stage sound and light coordinated operation system of the present patent application includes the stage performance control center, the first WLAN communication unit, the second WLAN communication unit, the master control center, the slave control center, the first ZIGBEE communication unit, the storage unit, the second ZIGBEE communication unit, the stage light subsystem, the third ZIGBEE communication unit and the stage sound subsystem. It achieves the centralized monitoring, unified management and synchronization control of multiple stage systems. It adopts a wireless control, so it reduces interference and improves stage performance effect and working efficiency.

BRIEF DESCRIPTION OF THE DRAWINGS

By reading the following detailed description of preferred embodiments below, a variety of other advantages and benefits will become clear to person skilled in the art. The drawings are only for the purpose of illustrating the preferred embodiments, and should not be considered as a limitation on the present patent application. Throughout the drawings, like parts may be referred to by like numerals, in which.

DETAILED DESCRIPTION

Below with reference to the drawings, the exemplary embodiment of the present disclosure is described in more detail. Although the drawings show the exemplary embodiments of the present disclosure, it should be understood that the present disclosure may be implemented in various forms and should not be limited to the embodiments illustrated herein. Rather, these embodiments are capable of a more thorough understanding of the present disclosure, and can completely convey the scope of the disclosure to those skilled in the art.

Figure 1:
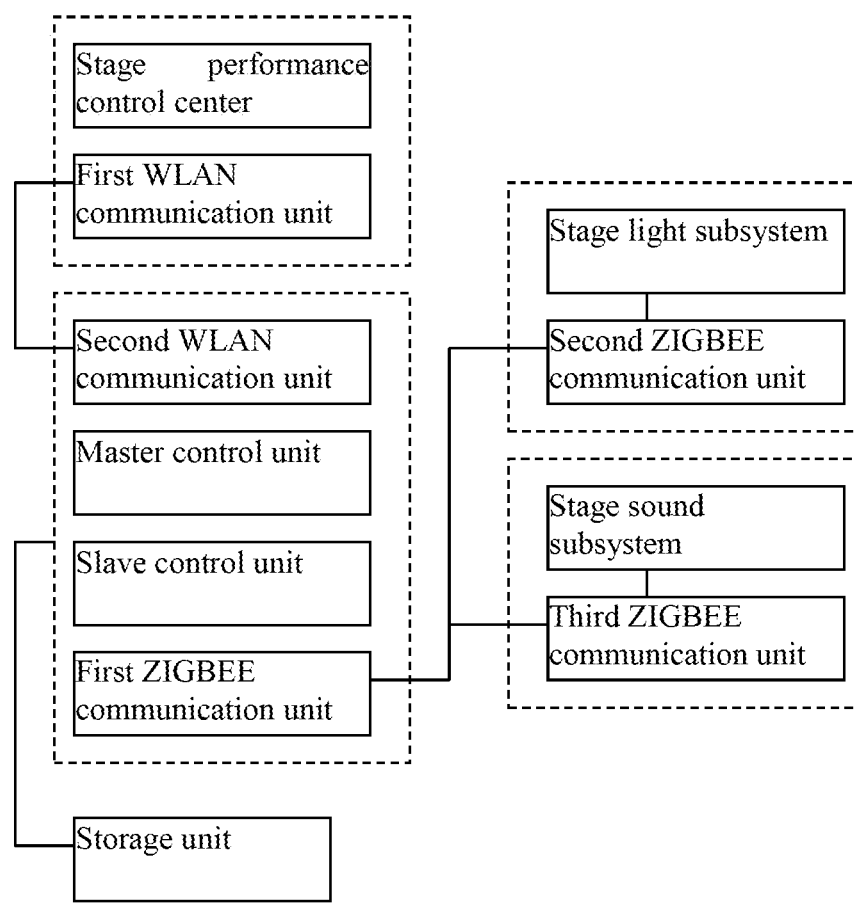
FIG. 1 illustrates a structural diagram of a wireless drive based stage sound and light coordinated operation system, according to an embodiment of the present patent application.

According to the embodiment of the present patent application, a wireless drive based stage sound and light coordinated operation system is provided. As shown in FIG. 1, the system includes a stage performance control center, a first WLAN communication unit, a second WLAN communication unit, a master control unit, a slave control unit, a first ZIGBEE communication unit, a storage unit, a second ZIGBEE communication unit, a stage light subsystem, a third ZIGBEE communication unit and a stage sound subsystem.

The stage performance control center is connected to the master control unit and the slave control unit with the first WLAN communication unit and the second WLAN communication unit successively. The master control unit and the slave control unit are connected to the stage light subsystem and the stage sound subsystem with the first ZIGBEE communication unit, the second ZIGBEE communication unit and the third ZIGBEE communication unit respectively.

The stage performance control center is configured to store and set up the scheme required by a stage performance and the parameters executed by each subsystem.

The master control unit is configured to control the operation of each stage subsystem and receive the data information transmitted by each subsystem.

The storage unit is configured to store the performance scheme and parameters downloaded by the master control unit from the stage performance control center.

The slave control unit is the hot standby unit of the master control unit, configured to switch seamlessly when failure or upgrading happens on the master control unit.

The stage light subsystem and the stage sound subsystem are configured to control the light and sound unit, according to the instruction of the master control unit.

Figure 2:
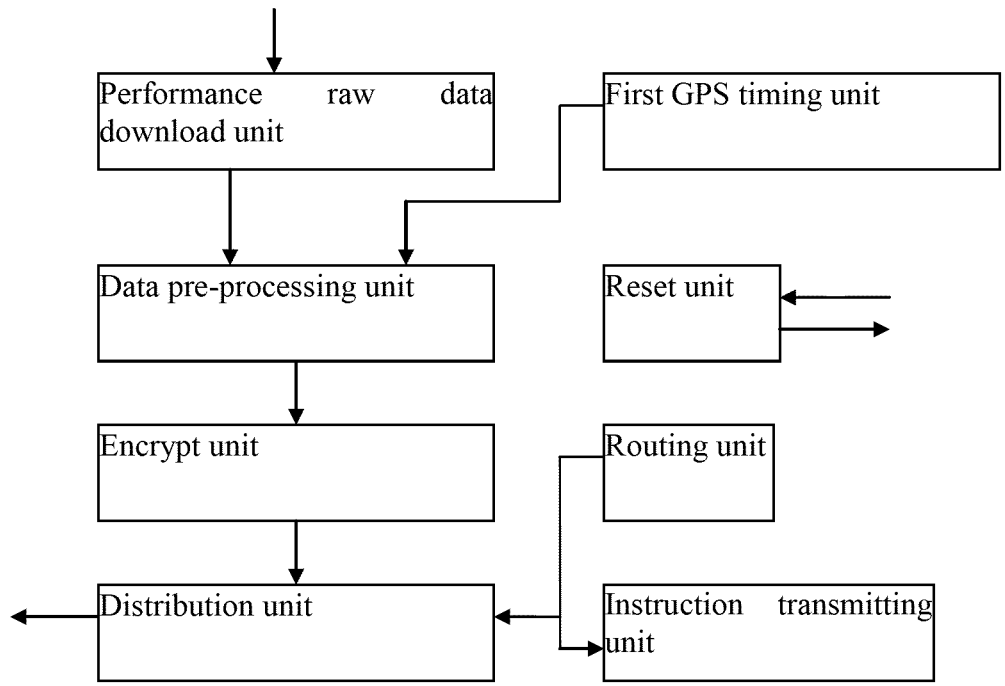
FIG. 2 illustrates a structural diagram of a master control unit, according to an embodiment of the present patent application.

According to the embodiment of the present patent application, as shown in the FIG. 2, the master control unit specifically includes a performance raw data download unit, a first GPS timing unit, a data pre-processing unit, an encryption unit, a routing unit, a reset unit, a distribution unit, an instruction transmitting unit.

The performance raw data download unit is configured to acquire the raw and independent performance data of the stage light subsystem and the stage sound subsystem from the stage performance control center.

The first GPS timing unit is configured to acquire a GPS time signal and transmit the time signal to the data pre-processing unit as a real-time parameter.

The data pre-processing unit is configured to encode the independent performance data of the stage light subsystem and the stage sound subsystem to the stage deep processing performance data according to a performance time setting and a GPS time parameter. The deep processing includes uniformly encoding each of the independent performance data in accordance with the GPS timeline and creating a two dimensional table with synchronized actions and time.

The encryption unit is configured to encrypt the stage deep processing performance data after being encoded by the data pre-processing unit.

The routing unit is configured to acquire the routing address of the subsystem which need to transmit performance data, according to a pre-assigned IP address.

The reset unit is configured to reset the stage light subsystem and the stage sound subsystem, including establishing a connection with the stage light subsystem and the stage sound subsystem and acquiring the original state of the stage light subsystem and the stage sound subsystem.

The distribution unit is configured to distribute the stage deep processing performance data to the stage light subsystem and the stage sound subsystem, according to a routing address.

The instruction transmitting unit is configured to transmit instructions to one or a combination of the stage light subsystem and the stage sound subsystem, according to a performance time setting. The control instructions are configured to direct to carry out a stage performance, according to the corresponding data items of the stage deep processing performance data.

According to the embodiment of the present patent application, the slave control unit is configured with the same settings as the master control unit. The slave control unit is in the state of hot standby during a stage performance.

Figure 3:
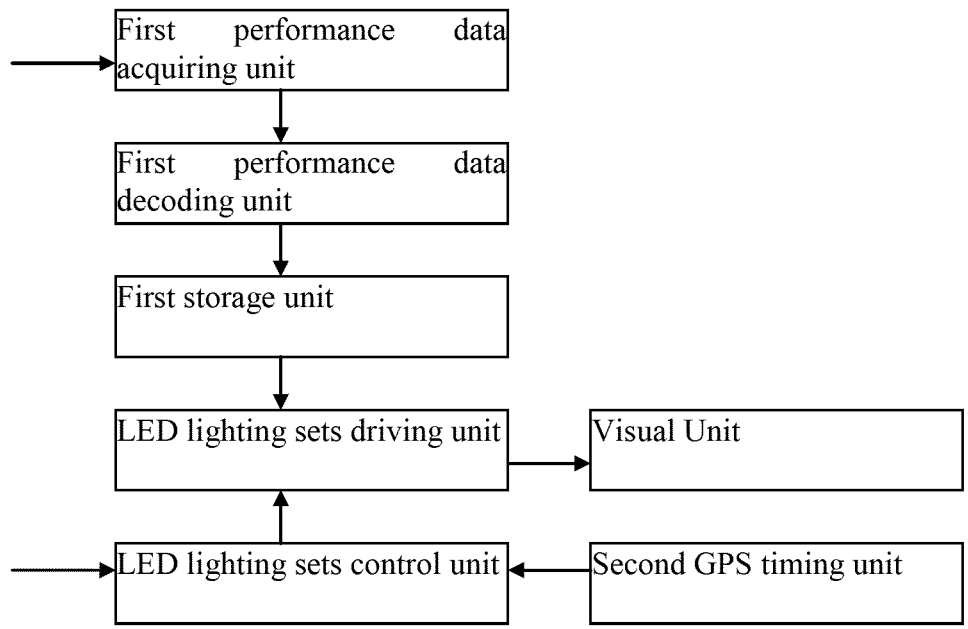
FIG. 3 illustrates a structural diagram of a stage light subsystem, according to an embodiment of the present patent application.

According to the embodiment of the present patent application, as shown FIG. 3, the stage light subsystem specifically includes a visual unit, a first performance data acquiring unit, a first performance data decoding unit, a second GPS timing unit, a LED lighting sets control unit, a first storage unit, a LED lighting sets driving unit. The visual unit, the first performance data acquiring unit, the first performance data encoding unit, the second GPS timing unit, the first storage unit and the LED lighting sets driving unit are all connected to the LED lighting sets control unit. The LED lighting sets driving unit is connected to LED lighting sets.

The visual unit is configured to display the stage lighting model in real time.

The first performance data acquiring unit is configured to receive the stage deep processing performance data transmitted by the master control unit.

The first performance data decoding unit is configured to decode the performance parameters of the LED lighting sets from the received stage deep processing performance data.

The LED lighting sets control unit is configured to receive control instructions from the master control unit, furthermore control and drive the LED lighting sets, according to the performance parameters of the LED lighting sets and the timing signal provided by the second GPS timing unit.

The first storage unit is configured to store the performance parameters of the LED lighting sets.

The LED lighting sets driving unit is configured to drive the LED lighting sets, according to the instruction of the LED lighting sets control unit.

According to a preferred embodiment of the present patent application, the LED lighting sets control unit includes a stage model creating unit, a reset unit, a target focus position selection unit, a LED lighting sets selection unit, a LED lighting sets rotation control unit, a focus image simulation unit and a lighting instruction execution unit.

The stage model creating unit is configured to create a stage model with the program preinstalled in the LED lighting sets control unit according to the position information data of the actual stage, and export the created stage model to the visual unit.

The reset unit is configured to transmit a control signal to the LED lighting sets driving unit with the program preinstalled in the LED lighting sets control unit and drive the LED lighting sets driving unit to move the LED lighting sets to the initial position.

The target focus position selection unit is configured to select a target focus position on the stage model and transform the target focus position to its position information data on the actual stage.

The LED lighting sets selection unit is configured to select all pre-adjusted LED lighting sets and detect the relative focus position of the selected LED lighting set is a valid LED lighting set.

The LED lighting sets rotation control unit is configured to calculate the values of a horizontal rotation angle and a vertical rotation angle for each valid LED lighting sets according to the position data of the target focus, transform the values of the horizontal rotation angle and the vertical rotation angle into a control signal, and transmit the control signal to the LED lighting sets driving unit to drive the LED lighting sets to rotate to corresponding position and direction.

The focus image simulation unit is configured to simulate the focus image that all valid LED lighting sets cast to the target focus position on the stage model and export the simulated image to the visual unit; and The lighting instruction execution unit is configured to execute a lighting action according to the performance parameters of each LED lighting sets.

Figure 4:
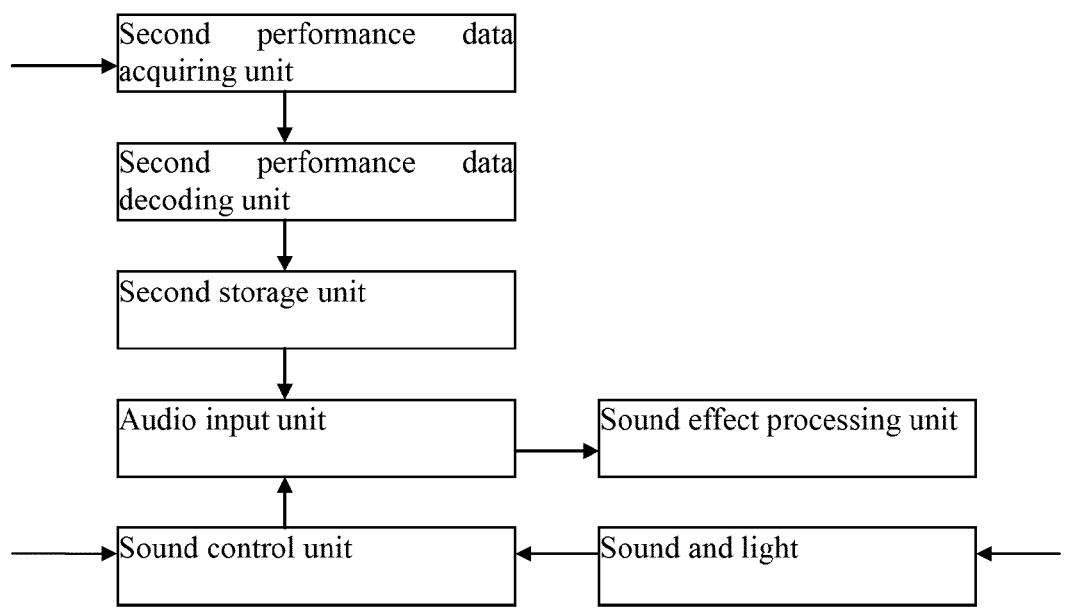
FIG. 4 illustrates a structural diagram of a stage sound subsystem, according to an embodiment of the present patent application.

According to the embodiment of the present patent application, as shown in FIG. 4, the stage sound subsystem includes a second performance data acquiring unit, a second performance data decoding unit, a second storage unit, a sound control unit, a sound and light matching unit, an audio input unit and an audio effect processing unit.

The second performance data acquiring unit, the second performance data decoding unit, the second storage unit, the sound and light matching unit, the audio input unit and the audio effect processing unit are all connected to the sound control unit.

The second performance data acquiring unit is configured to receive the stage deep processing performance data transmitted by the master control unit.

The second performance data decoding unit is configured to decode out a sound performance parameter from the received stage deep processing performance data.

The second storage unit is configured to store sound performance parameters.

The sound and light matching unit is configured to induce and acquire the light change parameters of the LED lighting sets in real time so as to match sound and light in real time.

The sound control unit is configured to receive a control instruction from the master control unit, control and drive sound according to the sound performance parameters and the light change parameters induced by the sound and light matching unit.

The audio input unit is configured to transmit audio data to the audio effect processing unit according to the control instruction of the sound control unit.

The audio effect processing unit is configured to process and play audio data.

According to the preferred embodiment of the present patent application, the sound and light matching unit includes a photoelectric transformation circuit, a photoelectric inductive shaping circuit, a photoelectric inductive detection circuit and a D/A converter circuit. One end of the photoelectric transformation circuit is connected to the input of the inductive optical signal. The other end of the photoelectric transformation circuit is connected to the photoelectric inductive shaping circuit. The photoelectric inductive shaping circuit is connected to the photoelectric inductive detection circuit. The photoelectric inductive detection circuit is connected to the D/A converter circuit. The D/A converter circuit is connected to the sound control unit.

According to the preferred embodiment of the present patent application, the photoelectric transformation circuit includes a photoelectric inductive circuit, a first preamplifier, a low pass filter and a shaper. The photoelectric circuit is connected to the first preamplifier. The first preamplifier is connected to the low pass filter. The low pass filter is connected to the shaper.

According to the preferred embodiment of the present patent application, the photoelectric inductive detection circuit includes a drive circuit, a second preamplifier, a phase sensitive detector, a balanced filter, a gain amplifier and a signal processor. The drive circuit is connected to the second preamplifier. The second preamplifier is connected to the phase sensitive detector. The phase sensitive detector is connected to the balanced filter. The balanced filter is connected to the gain amplifier. The gain amplifier is connected to the signal processor.

According to the preferred embodiment of the present patent application, the audio effect processing unit includes a main speaker unit, an auxiliary speaker unit and a bass speaker unit.

The main speaker unit includes a first equalizer, an exciter, a feedback suppressor, a first compressor, a first power amplifier and a main speaker. One end of the first equalizer is connected to the sound control unit. The other end of the first equalizer is connected to the exciter. The exciter is connected to the feedback suppressor. The feedback suppressor is connected to the first compressor. The first compressor is connected to the first power amplifier. The first power amplifier is connected to the main speaker.

The auxiliary speaker unit includes a second equalizer, a delayer, a second compressor, a second amplifier and an auxiliary speakers. One end of the second equalizer is connected to the sound control unit. The other end of the second equalizer is connect the delayer. The delayer is connected to the second compressor. The second compressor is connected to the second power amplifier. The second power amplifier is connected to the second auxiliary speaker.

The bass speaker unit includes a third equalizer, a frequency divider, a third compressor, a third power amplifier and a bass speaker. One end of the third equalizer is connected to the sound control unit. The other end of the third equalizer is connected to the frequency divider. The frequency divider is connected to the third compressor. The third compressor is connected to the bass speaker.

The above is only the preferred embodiment of the present invention, but the scope of the present invention is not limited thereto, and within the scope of the present invention disclosed in the present invention, all the changes and replacements that any skilled in the art can be easily think of should fall within the scope of the present invention. Accordingly, the scope of the present invention should be the scope of the claims shall prevail.

What is claimed is:

1. A wireless drive based sound and light stage coordinated operation system, comprising:
   a stage performance control center, and a first wireless local area network (WLAN) communication unit both performed in a first hardware platform;
   a second WLAN communication unit, a master control unit, a slave control unit, and a first ZIGBEE communication unit all performed in a second hardware platform;
   a second ZIGBEE communication unit, and a stage light subsystem both performed in a third hardware platform;
   a third ZIGBEE communication unit, and a stage sound subsystem both performed in a fourth hardware platform; and
   a first storage unit;
   wherein the stage performance control center is connected to the master control unit and the slave control unit via a communication between the first WLAN communication unit and the second WLAN communication unit, the master control unit and the slave control unit are connected to the stage light subsystem via a communication between the first ZIGBEE communication unit and the second ZIGBEE communication unit, and the master control unit and the slave control unit are connected to the stage sound subsystem via a communication between the first ZIGBEE communication unit, and the third ZIGBEE communication unit;
   the stage performance control center is configured to store and set up a scheme required by a stage performance and a parameter required by each subsystem;
   the master control unit is configured to control operation of each stage subsystem and receive data information transmitted by each subsystem;
   the slave control unit serves as a hot standby unit of the master control unit, configured to switch seamlessly when failure or upgrading happens on the master control unit;
   the stage light subsystem and the stage sound subsystem is configured to control a light and sound unit according to instructions of the master control unit;
   wherein the master control unit, performed by a processor in the second hardware platform, comprises:
   a performance raw data download unit configured to acquire a raw and independent performance data of the stage light subsystem and stage sound subsystem from the stage performance control center respectively;
   a first GPS timing unit configured to acquire a GPS time signal in real-time, and transmit the time signal to a data pre-processing unit as a real-time parameter;
   a data pre-processing unit configured to encode an independent performance data of the stage light subsystem and the stage sound subsystem to a stage deep processing performance data according to a performance time setting and a GPS time parameter; the deep processing comprising uniformly encoding the independent performance data according to a GPS time line and creating a two dimensional table with synchronous time and action;
   a distribute unit configured to distribute a stage deep processing performance data to the stage light subsystem and the stage sound subsystem according to a routing address; and
   an instruction transmitting unit configured to transmit a control instruction to one or a combination of the stage light subsystem and the stage sound subsystem according to a performance time setting, the instruction transmitting unit is configured to carry out a stage performance according to corresponding data items of the stage deep processing performance data.

2. The system according to claim 1, wherein the master control unit further comprises:
   an encryption unit being configured to encrypt the stage deep processing performance data after being encoded by the data pre-processing unit;
   a routing unit being configured to transmit a routing address of subsystem which is needed to transmit a performance data according to a preassigned IP address; and
   a reset unit being configured to rest the stage light subsystem and the stage sound subsystem, comprising creating a connection with the stage light subsystem and the stage sound subsystem and acquiring an original state of the stage light subsystem and the stage sound subsystem.

3. The system according to claim 2, wherein the slave control unit is configured with a same setting as the master control unit, and is in hot standby state during a stage performance.

4. The system according to claim 3, wherein the stage light subsystem, performed by a processor in the third hardware platform, comprises a visual unit, a first performance data acquiring unit, a first performance data decoding unit, a second GPS timing unit, a LED lighting sets control unit, a first second storage unit, and a LED lighting sets driving unit, wherein the visual unit, the first performance data acquiring unit, the first performance data decoding unit, the second GPS timing unit, the second storage unit and the LED lighting set driving unit are all connected to the LED lighting sets control unit, the LED lighting sets driving unit is connected to LED lighting sets.

5. The system according to claim 4, wherein the visual unit is configured to display a stage lighting model in real time, the first performance data acquiring unit is configured to receive the stage deep processing performance data transmitted by the master control unit, the first performance data decoding unit is configured to decode performance parameters of the LED lighting sets from the received stage deep processing performance data, the LED lighting sets control unit is configured to receive control instructions from the master control unit, control and drive the LED lighting sets according to the performance parameters of the LED lighting sets and a timing signal provided by the second GPS timing unit, the second storage unit is configured to store the performance parameters of the LED lighting sets, the LED lighting sets driving unit is configured to drive the LED lighting sets according to the instructions of the LED lighting sets control unit.

6. The system according to claim 5, wherein the LED lighting sets control unit comprises a stage model creating unit, a reset unit, a target focus position selection unit, a LED lighting sets selection unit, a LED lighting sets rotation control unit, a focus image simulation unit, and a lighting instruction execution unit.

7. The system according to claim 6, wherein the stage model creating unit is configured to create a stage model with a program preinstalled in the LED lighting sets control unit according to position information data of an actual stage, and export the created stage model to the visual unit.

8. The system according to claim 7, wherein the reset unit is configured to transmit a control signal to the LED lighting sets driving unit with the program preinstalled in the LED lighting sets control unit and drive the LED lighting sets driving unit to move the LED lighting sets to an initial position.

9. The system according to claim 8, wherein the target focus position selection unit is configured to select a target focus position on the stage model and transform the target focus position to the position information data on the actual stage.

10. The system according to claim 9, wherein the LED lighting sets selection unit is configured to select pre-adjusted LED lighting sets and detect whether relative focus positions of the selected pre-adjusted LED lighting sets are valid to identify valid LED lighting sets.

11. The system according to claim 10, wherein the LED lighting sets rotation control unit is configured to calculate values of a horizontal rotation angle and a vertical rotation angle for each of the valid LED lighting sets according to position data of the target focus position, transform the values of the horizontal rotation angle and the vertical rotation angle into a control signal, and transmit the control signal to the LED lighting sets driving unit to drive the LED lighting sets to rotate to a corresponding position and a corresponding direction.

12. The system according to claim 11, wherein the focus image simulation unit is configured to simulate a focus image that all valid LED lighting sets cast to the target focus position on the stage model and export the simulated image to the visual unit; and the lighting instruction execution unit is configured to execute a lighting action according to the performance parameters of each of the LED lighting sets.

13. The system according to claim 12, wherein the stage sound subsystem, performed by a processor in the fourth hardware platform, comprises a second performance data acquiring unit, a second performance data decoding unit, a third storage unit, a sound control unit, a sound and light matching unit, an audio input unit, and an audio effect processing unit; the second performance data acquiring unit, the second performance data decoding unit, the third storage unit, the sound and light matching unit, the audio input unit and the audio effect processing unit are all connected to the sound control unit.

14. The system according to claim 13, wherein the second performance data acquiring unit is configured to receive the stage deep processing performance data transmitted by the master control unit, the second performance data decoding unit is configured to decode out a sound performance parameter from the received stage deep processing performance data, the third storage unit is configured to store sound performance parameters, the sound and light matching unit is configured to induce and acquire light change parameters of the LED lighting sets in real time so as to match sound and light in real time, the sound control unit is configured to receive a control instruction from the master control unit, control and drive sound according to the sound performance parameters and the light change parameters induced by the sound and light matching unit, the audio input unit is configured to transmit audio data to the audio effect processing unit according to the control instruction of the sound control unit, and the audio effect processing unit is configured to process and play audio data.

15. The system according to claim 14, wherein the sound and light matching unit comprises a photoelectric transformation circuit, a photoelectric inductive shaping circuit, a photoelectric inductive detection circuit and a D/A converter circuit, one end of the photoelectric transformation circuit is connected to the input of a inductive optical signal, the other end of the photoelectric transformation circuit is connected to the photoelectric inductive shaping circuit, the photoelectric inductive shaping circuit is connected to the photoelectric inductive detection circuit, the photoelectric inductive detection circuit is connected to the D/A converter circuit, and the D/A converter circuit is connected to the sound control unit.

16. The system according to claim 15, wherein the photoelectric transformation circuit comprises a photoelectric inductive circuit, a first preamplifier, a low pass filter and a shaper, the photoelectric inductive circuit is connected to the first preamplifier, the first preamplifier is connected to the low pass filter, and the low pass filter is connected to the shaper.

17. The system according to claim 16, wherein the photoelectric inductive detection circuit comprises a drive circuit, a second preamplifier, a phase sensitive detector, a balanced filter, a gain amplifier, and a signal processor, the drive circuit is connected to the second preamplifier, the second preamplifier is connected to the phase sensitive detector, the phase sensitive detector is connected to the balanced filter, the balanced filter is connected to the gain amplifier, and the gain amplifier is connected to the signal processor.

18. The system according to claim 17, wherein the audio effect processing unit comprises a main speaker unit, an auxiliary speaker unit and a bass speaker unit;
the main speaker unit comprises a first equalizer, an exciter, a feedback suppressor, a first compressor, a first power amplifier and a main speaker, one end of the first equalizer is connected to the sound control unit, the other end of the first equalizer is connected to the exciter, the exciter is connected to the feedback suppressor, the feedback suppressor is connected to the first compressor, the first compressor is connected to the first power amplifier, the first power amplifier is connected to the main speaker;

the auxiliary speaker unit comprises a second equalizer, a delayer, a second compressor, a second amplifier and an auxiliary speaker, one end of the second equalizer is connected to the sound control unit, the other end of the second equalizer is connect the delayer, the delayer is connected to the second compressor, the second compressor is connected to the second power amplifier, and the second power amplifier is connected to the auxiliary speaker; and the bass speaker unit comprises a third equalizer, a frequency divider, a third compressor, a third power amplifier and a bass speaker, one end of the third equalizer is connected to the sound control unit, the other end of the third equalizer is connected to the frequency divider, the frequency divider is connected to the third compressor, and the third compressor is connected to the bass speaker.

\* \* \* \* \*